(12) United States Patent
Schirtzinger et al.

(10) Patent No.: US 8,286,416 B2
(45) Date of Patent: Oct. 16, 2012

(54) VALVE SYSTEM FOR A GAS TURBINE ENGINE

(75) Inventors: Gary A. Schirtzinger, Glastonbury, CT (US); Lance Wurzbacher, Simi Valley, CA (US); Joseph L. Orr, Glastonbury, CT (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 1231 days.

(21) Appl. No.: 12/061,021

(22) Filed: Apr. 2, 2008

(65) Prior Publication Data

US 2009/0252597 A1    Oct. 8, 2009

(51) Int. Cl.
F02K 1/00 (2006.01)
B63H 25/46 (2006.01)

(52) U.S. Cl. ..................................... 60/231; 239/265.17
(58) Field of Classification Search .................. 60/39.23, 60/226.1, 226.3, 231, 262, 267, 226.2; 239/123.3, 239/127.1, 265.17, 265.19
See application file for complete search history.

(56) References Cited

U.S. PATENT DOCUMENTS

| | | | |
|---|---|---|---|
| 4,570,668 A | 2/1986 | Burke et al. | |
| 4,674,951 A | 6/1987 | Jourdain et al. | |
| 4,679,982 A | 7/1987 | Bouiller et al. | |
| 4,711,084 A | 12/1987 | Brockett | |
| 4,854,127 A | 8/1989 | Vinson et al. | |
| 5,012,639 A | 5/1991 | Ream et al. | |
| 5,123,240 A | 6/1992 | Frost et al. | |
| 5,127,222 A | 7/1992 | Ream et al. | |
| 5,211,007 A | 5/1993 | Marvin | |
| 5,307,624 A | 5/1994 | Even-Nur et al. | |
| 5,833,139 A * | 11/1998 | Sondee et al. | 239/265.17 |
| 5,845,482 A * | 12/1998 | Carscallen | 60/785 |
| 5,867,980 A | 2/1999 | Bartos | |
| 6,301,877 B1 | 10/2001 | Liang et al. | |
| 6,385,959 B1 | 5/2002 | Montoya | |
| 6,471,475 B1 | 10/2002 | Sasu et al. | |
| 6,622,475 B2 | 9/2003 | Brault et al. | |
| 6,679,048 B1 | 1/2004 | Lee et al. | |
| 6,694,723 B2 | 2/2004 | Ward | |
| 6,701,715 B2 | 3/2004 | Anderson et al. | |
| 6,802,691 B2 | 10/2004 | Chlus | |
| 6,877,306 B2 | 4/2005 | Wernberg et al. | |
| 6,895,756 B2 | 5/2005 | Schmotolocha et al. | |
| 6,907,724 B2 | 6/2005 | Edelman et al. | |
| 6,997,676 B2 | 2/2006 | Koshoffer | |
| 7,028,484 B2 | 4/2006 | Prociw et al. | |
| 7,032,835 B2 | 4/2006 | Murphy et al. | |
| 7,055,303 B2 | 6/2006 | Macfarlane et al. | |
| 7,093,442 B2 | 8/2006 | Lovett | |
| 7,114,519 B2 | 10/2006 | Aitchison et al. | |
| 7,174,704 B2 | 2/2007 | Renggli | |
| 7,189,055 B2 | 3/2007 | Marini et al. | |
| 7,225,623 B2 | 6/2007 | Koshoffer | |
| 7,244,104 B2 | 7/2007 | Girgis et al. | |
| 2003/0126853 A1 | 7/2003 | Koshoffer et al. | |
| 2003/0217552 A1 | 11/2003 | Calabro | |
| 2004/0006969 A1 | 1/2004 | Whurr | |
| 2004/0187474 A1 | 9/2004 | Martens et al. | |
| 2004/0216444 A1 | 11/2004 | Lovett | |

(Continued)

*Primary Examiner* — Ehud Gartenberg
*Assistant Examiner* — Arun Goyal
(74) *Attorney, Agent, or Firm* — Carlson, Gaskey & Olds PC

(57) ABSTRACT

A valve system intermediate a secondary flow path and a primary flow path to selectively communicate secondary airflow into the primary gas flow path and control airflow injected from a higher pressure plenum into a lower pressure flowpath.

16 Claims, 5 Drawing Sheets

U.S. PATENT DOCUMENTS

2005/0081509 A1 4/2005 Johnson
2005/0091982 A1 5/2005 Renggli et al.
2005/0172611 A1 8/2005 Blodgett

* cited by examiner

VALVE SYSTEM FOR A GAS TURBINE ENGINE

BACKGROUND OF THE INVENTION

The present invention relates to a gas turbine engine, and more particularly to a valve system for operation therewith.

A gas turbine engine, such as a turbofan engine for an aircraft, includes a fan section, a compression section, a combustion section, and a turbine section. An axis of the engine is centrally disposed within the engine, and extends longitudinally through these sections. A primary flow path extends axially through the engine. An annular secondary flow path is generally located radially outward of the primary flow path.

Cooling air along the secondary flow path is often communicated to the primary flow path during particular operating conditions. In order to assure efficient engine operation and performance, communication of the cooling air from the secondary flow path to the primary flow path needs to be meticulously rationed.

SUMMARY OF THE INVENTION

The valve system according to an exemplary aspect of the present invention is located intermediate a secondary flow path and a primary exhaust flow path. The valve system selectively communicates secondary airflow to control airflow from a higher pressure plenum into a lower pressure flowpath of a gas turbine engine. The valve system generally includes a plate which is slidably mounted relative to a frame for movement between a closed position and an open position.

Another exemplary aspect of the present invention provides an arcuate plate supported upon arcuate tracks movable between a closed position and an open position.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
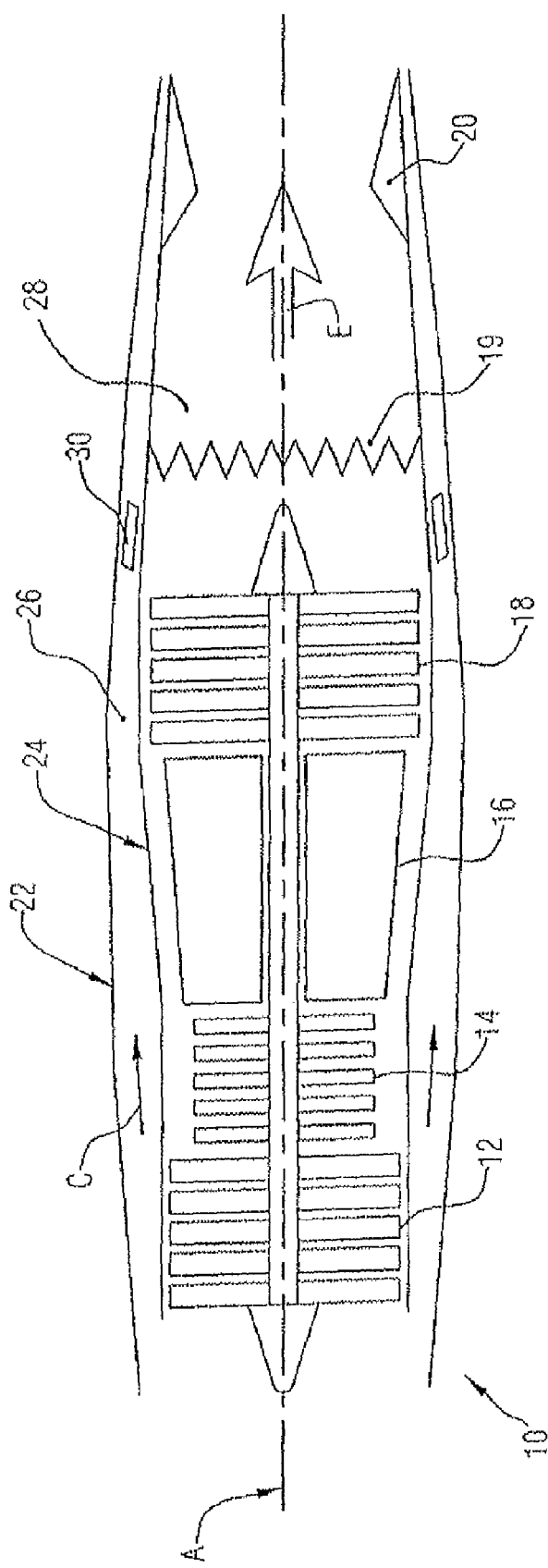
FIG. 1 is a general sectional view an exemplary gas turbine engine embodiment for use with the present invention.

FIG. 1 schematically illustrates a gas turbine engine 10 which generally includes a fan section 12, a compressor section 14, a combustor section 16, a turbine section 18, an augmentor section 19, and a nozzle section 20. The compressor section 14, combustor section 16, and turbine section 18 are generally referred to as the core engine. An axis of the engine A is centrally disposed and extends longitudinally through these sections.

An engine duct structure 22 and an inner cooling liner structure 24 define an annular secondary flow path 26 at least partially around a perimeter of a primary flow path 28 which directs a primary combustion core gas exhaust flow (illustrated schematically by arrow E). It should be understood that the engine duct structure 22 may also at least partially define various airflow paths other than the disclosed secondary flow path 26.

The secondary flow path 26 guides a secondary airflow C between the engine duct structure 22 and the inner cooling liner structure 24. The secondary airflow as defined herein may be any airflow different from the primary combustion core gas exhaust flow E such as an advent cycle third stream fan flow which may be sourced from the fan section 12 and/or compressor section 14. The secondary airflow C is utilized for a multiple of purposes including, for example, cooling, pressurization, partial shielding and mixing with the core gas flow E in the nozzle section 20 during particular operational profiles. The valve system 30 operates rapidly and repeatedly while configured to be received within minimal package space.

A valve system 30 is located intermediate the secondary flow path 26 and the primary flow path 28 to selectively communicate secondary airflow C into the primary gas flow path E. For example only, under certain conditions, such as when an aircraft is hovering, less secondary airflow may be required in the nozzle section 20. By blocking the secondary airflow thereto, additional secondary airflow then becomes available for other purposes. It should be understood that the valve system 30 may be utilized in any location and any environment to control airflow injected from a higher pressure plenum into a lower pressure flowpath such as, for example only, in a nozzle section of a gas turbine engine.

Figure 2A:
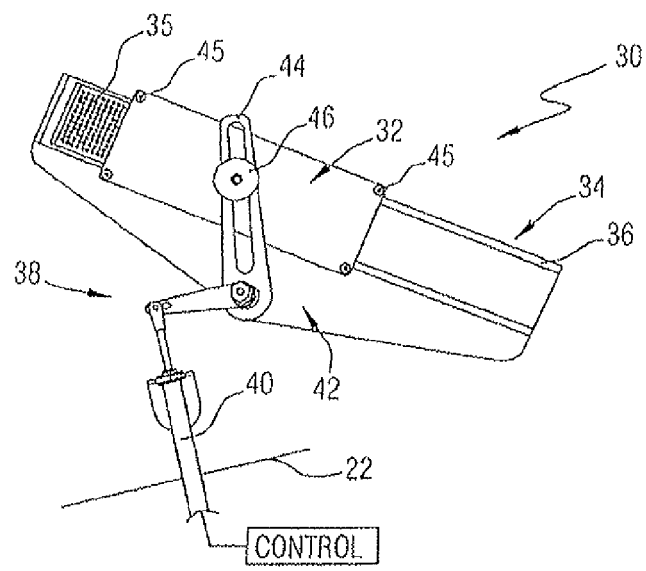
FIG. 2A is an expanded view of a valve system in a partially closed position for use with the gas turbine engine.
Figure 2B:
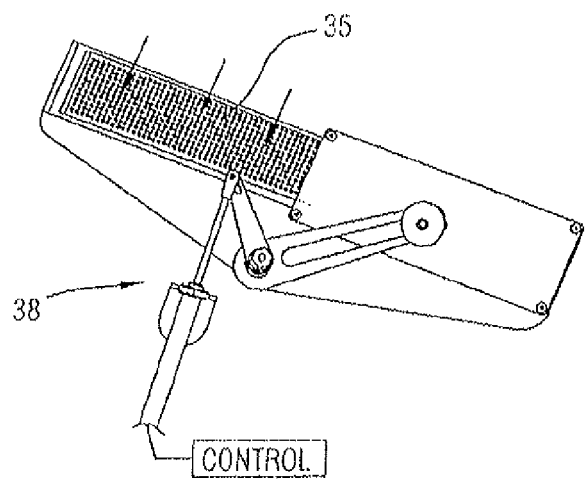
FIG. 2B is an expanded view of a valve system in an open position for use with the gas turbine engine.

Referring to FIG. 2A, the valve system 30 generally includes a plate 32 which is slidably mounted relative to a frame 34 for movement between a closed position and an open position (FIG. 2B). The plate 32 is movable relative the frame 34 along a slider rail 36 which may be a section of the frame 34.

The frame 34 may be mounted to a plenum wall such as the inner cooling liner structure 24 (FIG. 1) to provide for communication between the secondary flow path 26 and the primary flow path 28. The frame 34 at least partially surrounds an airflow path 35 (FIG. 2B) which may further guide the airflow between the secondary flow path 26 and the primary flow path 28. The airflow path 35 may include a mesh, grid, metering hole arrangement, honeycomb structure, or such like which directs and smoothes the airflow therethrough as well as reduces noise generation.

An actuator system 38 having a hydraulic, pneumatic or electromagnetic actuator 40 controls movement of the plate 32 through a linkage 42. The actuator 40 may be located though the engine duct structure 22 such that drive components and such like of the actuator system 38 may be located external to the engine duct structure 22. It should be understood that various actuator systems may be usable with the present invention.

The linkage 42 generally includes a crank 44 mounted to the frame 34 which engages a roller 46 mounted to the plate 32. Plate roller posts 45 engage slider rail 36 to guide plate 32 thereon. The crank 44, although illustrated in the disclosed embodiment as a generally right-angle bellcrank, may include cranks of various types as well as other linkages may alternatively or additionally be provided.

Figure 3A:
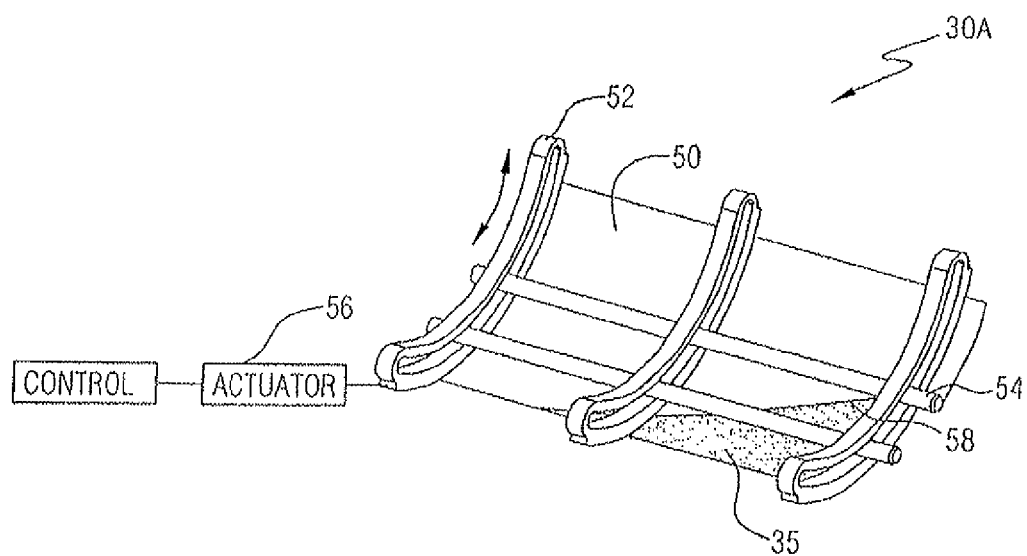
FIG. 3 is a perspective view of another valve system for use with the gas turbine engine.
Figure 4A:
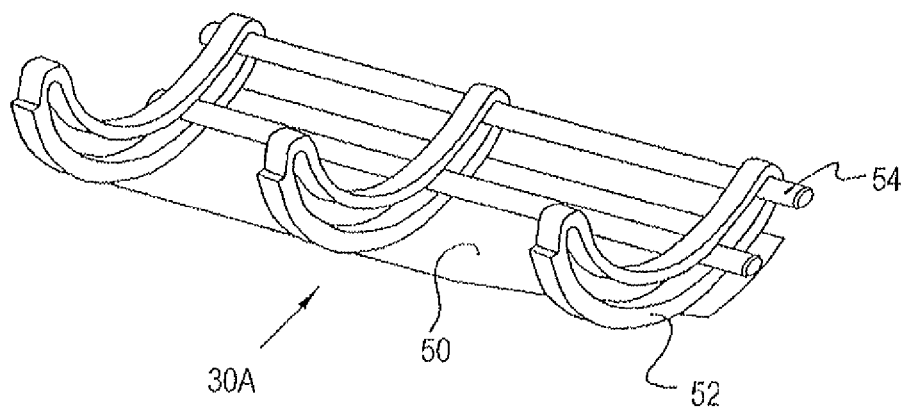
FIGS. 4A and 4B are views of the valve system of FIG. 3 in a closed position.
Figure 4B:
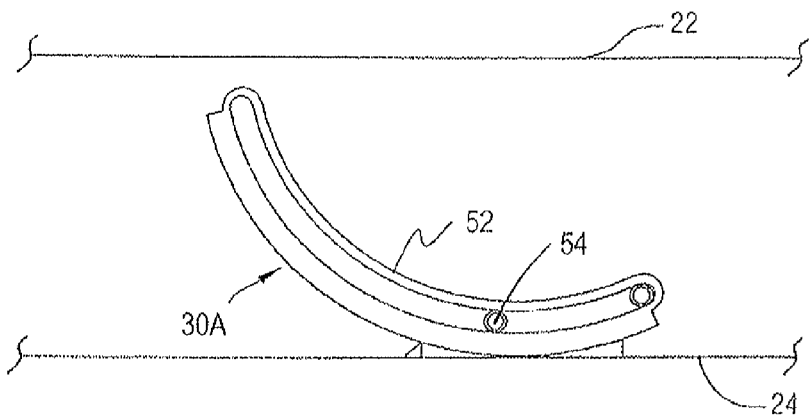
Figure 5A:
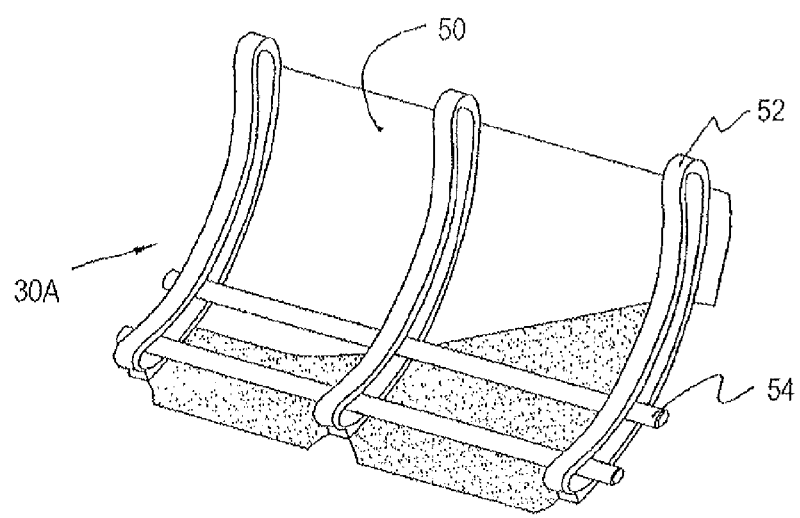
FIGS. 5A and 5B are views of the valve system of FIG. 3 in an open position.
Figure 5B:
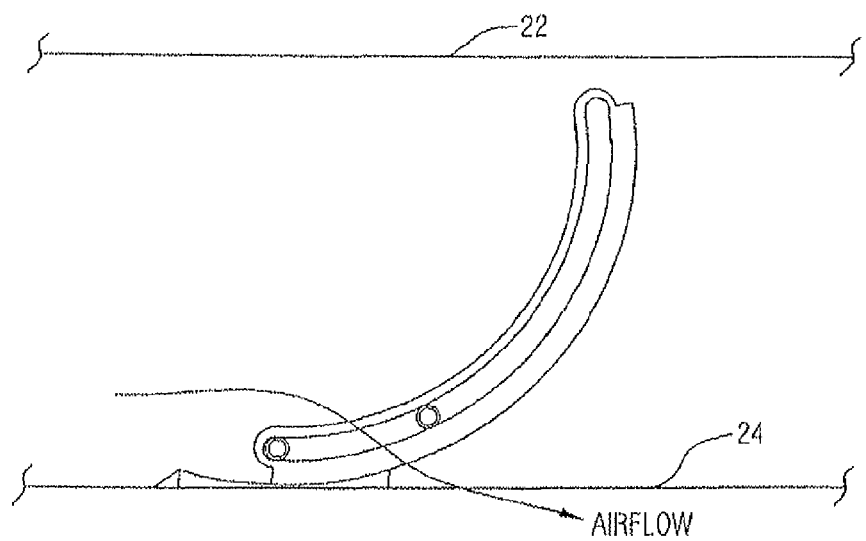

Referring to FIG. 3, another embodiment of the valve system 30A includes an arcuate plate 50 supported upon arcuate tracks 52 which are movable relative a frame, guides 54, between a closed position (FIGS. 4A and 4B) and an open position (FIGS. 5A and 5B) through an actuator system 56 (illustrated schematically). The guides 54 are mounted in a fixed location relative to, in one disclosed embodiment, a plenum wall such as the inner cooling liner structure 24 to provide for communication between the secondary flow path 26 and the primary flow path 28. The arcuate plate 50 moves to selectively block the airflow path 35' between the secondary flow path 26 and the primary flow path 28.

The arcuate plate 50 may include an angled edge 58 such that a predetermined volume of airflow is communicated relative to movement of the arcuate plate 50. The angled edge 58 may also be arranged to permit a quantity of airflow through the airflow path 35' even when the arcuate plate 50 is in a closed position. Furthermore, it should be understood that other edge arrangements which provide other airflow passage relative to arcuate plate 50 may alternatively be provided. It should be understood that other opening sequences and arrangements may alternatively or additionally be provided.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A valve system intermediate a secondary flow path and a primary flow path of a gas turbine engine comprising:
    an engine core primary flow path;
    a fan flow secondary flow path coaxial with said primary flow path;
    a nozzle to eject said primary flow outside primary flow path;
    a frame including guides defining a passage between said primary flow path and said secondary flow path, said guides being mounted to an inner cooling liner structure of said inner engine core; and
    an arcuate plate slidable on an arcuate fashion on said guide between an open position permitting flow through said passage and a closed position locking flow through said passage, said arcuate plate located at a downstream end of said nozzle being moveable within said secondary flow path, and separating said secondary flow path from said primary flow path.

2. The system as recited in claim 1, wherein said frame is mounted to an inner cooling liner structure of a gas turbine engine.

3. The system as recited in claim 1, wherein said arcuate plate includes an angled edge.

4. The system as recited in claim 1, wherein said arcuate plate is supported upon an arcuate track, said arcuate track being mounted on said guides such that said guides guide movement of said arcuate track and said arcuate plate relative to said frame.

5. The system as recited in claim 1, further comprising an actuator system which slides said arcuate plate.

6. The system as recited in claim 1, wherein said arcuate plate includes an angled edge bounding said passage.

7. The system as recited in claim 1, wherein said arcuate plate includes an angled edge arranged to permit flow through the passage when the arcuate plate is in the closed position.

8. A gas turbine engine comprising:
    an engine duct structure and an inner cooling liner structure which at least partially defines an engine core primary flow path and a fan flow secondary flow path coaxial with said primary flow path;
    a nozzle to eject said primary flow outside said primary flow path;
    a frame mounted to said inner cooling liner structure, said frame including guides defining a passage between said primary flow path and said secondary flow path, said guides being mounted to said inner cooling liner structure; and
    at least one arcuate plate slidable in an arcuate fashion on said guides between an open position permitting flow through said passage between said secondary flow path and said primary flow path and a closed position blocking flow through said passage between said secondary flow path and said primary flow path, said arcuate plate located at a downstream end of said nozzle being moveable within said secondary flow path, and separating said secondary flow path from said primary flow path.

9. The engine as recited in claim 8, wherein said arcuate plate includes an angled edge.

10. The engine as recited in claim 8, wherein said arcuate plate is supported upon an arcuate track, said arcuate track being mounted on said guides such that said guides guide movement of said arcuate track and said arcuate plate relative to said frame.

11. The engine as recited in claim 8, wherein said secondary flow path is defined radially about said primary flow path.

12. The method as recited in claim 11, wherein said step (A) further comprises:
    (a) supporting the at least one arcuate plate on an arcuate track and sliding the at least one plate in an arcuate path along the guides.

13. The engine as recited in claim 8, wherein said at least one arcuate plate includes an angled edge bounding said passage.

14. The engine as recited in claim 8, wherein said at least one arcuate plate includes an angled edge arranged to permit flow through the passage when the arcuate plate is in the closed position.

15. A method of a controlling communication of a secondary flow path with a primary flow path of a gas turbine engine comprising the steps of:
    selectively sliding at least one arcuate plate on an arcuate fashion on guides defining a passage between an engine core primary flow path and a fan flow secondary flow path coaxial with said primary flow path, between an open position permitting flow through said passage between said secondary flow path and said primary flow path and a closed position blocking flow through said passage between said secondary flow path and said pri mary flow path, said arcuate plate located at a downstream end of a nozzle being moveable within said secondary flow path, and separating said secondary flow path from said primary flow path and electing said primary flow outside said primary flow path through said nozzle.

16. The method as recited in claim 11, wherein said step (A) further comprises:
 (a) sliding the at least one plate in an arcuate path along the guides.

\* \* \* \* \*